US011303530B2

(12) United States Patent
Yu et al.

(10) Patent No.: US 11,303,530 B2
(45) Date of Patent: Apr. 12, 2022

(54) RANKING OF ASSET TAGS

(71) Applicant: Kyndryl, Inc., New York, NY (US)

(72) Inventors: Jean Xu Yu, Austin, TX (US); Keri Wheatley, Austin, TX (US); Angelo Danducci, II, Austin, TX (US)

(73) Assignee: KYNDRYL, INC., New York, NY (US)

( * ) Notice: Subject to any disclaimer, the term of this patent is extended or adjusted under 35 U.S.C. 154(b) by 149 days.

(21) Appl. No.: 16/822,692

(22) Filed: Mar. 18, 2020

(65) Prior Publication Data

US 2021/0297322 A1    Sep. 23, 2021

(51) Int. Cl.
| H04L 41/14 | (2022.01) |
| G06N 20/00 | (2019.01) |
| H04L 41/042 | (2022.01) |
| H04L 41/046 | (2022.01) |
| H04L 41/08 | (2022.01) |
| G06Q 30/04 | (2012.01) |

(52) U.S. Cl.
CPC ............. *H04L 41/14* (2013.01); *G06N 20/00* (2019.01); *G06Q 30/04* (2013.01); *H04L 41/042* (2013.01); *H04L 41/046* (2013.01); *H04L 41/0886* (2013.01)

(58) Field of Classification Search
CPC ..... H04L 41/14; H04L 41/042; H04L 41/046; H04L 41/0886; G06N 20/00; G06Q 30/04
See application file for complete search history.

(56) References Cited

U.S. PATENT DOCUMENTS

| 5,920,700 A | 7/1999 | Gordon et al. |
| 7,747,603 B2 | 6/2010 | Apparao et al. |
| 10,241,816 B2 | 3/2019 | Bertram et al. |
| 2013/0173671 A1 | 7/2013 | Jager et al. |
| 2014/0289730 A1 | 9/2014 | Fitzgerald et al. |
| 2018/0276254 A1 | 9/2018 | Whitlock et al. |
| 2018/0276257 A1 | 9/2018 | Falkenberg et al. |
| 2021/0248457 A1* | 8/2021 | Odibat ................. G06N 3/0454 |

FOREIGN PATENT DOCUMENTS

CN    100407198 C    7/2008

OTHER PUBLICATIONS

Liu et al., Tag Ranking, WWW 2009, Track: Rich Media / Session: Tagging and Clustering, Apr. 20-24, 2009, Madrid, Spain, pp. 351-360.

* cited by examiner

*Primary Examiner* — Joe Chacko
(74) *Attorney, Agent, or Firm* — Garg Law Firm, PLLC; Rakesh Garg; Erik Swanson

(57) ABSTRACT

An embodiment includes calculating an efficacy value of a context assigned to an asset, the efficacy value being based at least in part on a percentage of assets assigned to the context. The embodiment also includes calculating, responsive to the calculated efficacy value being within a predetermined range, a normalized relevance value of a first tag associated with the asset. The embodiment also includes generating relative relevance value for the first tag and a reason code associated with a basis for the relative relevance value of the first tag based at least in part on the normalized relevance value of the first tag. The embodiment also includes initiating, responsive to generating the relative relevance value and the reason code for the first tag, a database command on a training dataset stored in the database that includes the first tag.

17 Claims, 5 Drawing Sheets

RANKING OF ASSET TAGS

BACKGROUND

The present invention relates generally to a method, system, and computer program product for asset management. More particularly, the present invention relates to a method, system, and computer program product for the ranking of asset tags.

Artificial intelligence (AI) technology has evolved significantly over the past few years. Modern AI systems are achieving human level performance on cognitive tasks like converting speech to text, recognizing or classifying objects and images, or translating between different languages. This evolution holds promise for new and improved applications in many industries.

The expansion and diversification of AI-based applications has led to an increased demand for specialized computing systems that can handle the demands and unique requirements of an AI-based technology. For example, AI-based applications often involve fluctuating workloads and experimentation that make it desirable to implement such applications on a scalable computing system. This growing demand has helped fuel another quickly-growing technology referred to as "cloud computing," which can meet these specialized requirements.

Cloud computing refers to the practice of using a network of remote servers hosted on a public network (e.g., the Internet) to deliver computing services (i.e., cloud computing services) as opposed to doing so on a local information server. The network architecture (e.g., virtualized information processing environment comprising hardware and software) through which these cloud computing services are provided to service consumers (i.e., a cloud computing service consumers) is referred to as "the cloud", which includes cloud computing services provided to cloud computing service consumers, networks or data centers that supply cloud computing services to only a specified group of cloud computing service consumers, and cloud computing services provided to a limited set of cloud computing service consumers, e.g., to agencies with a specific State/Region or set of States/Regions, as well as dedicated/hosted clouds and other emerging cloud computing service delivery models. The underlying intent of cloud computing is to provide easy, scalable access to computing resources and information technology (IT) services to cloud computing service consumers.

Cloud computing services can be broadly divided into four categories: Infrastructure-as-a-Service (IaaS), Platform-as-a-Service (PaaS), Software-as-a-Service (SaaS), and Managed Services. Infrastructure-as-a-Service refers to a virtualized computing infrastructure through which cloud computing services are provided (e.g., virtual server space, network connections, bandwidth, IP addresses, load balancers, etc.). Platform-as-a-Service in the cloud refers to a set of software and product development tools hosted on the cloud for enabling developers (i.e., a type of cloud service consumer) to build applications and services using the cloud. Software-as-a-Service refers to applications that are hosted on and available on-demand by cloud service consumers via the cloud. Managed Services refers to services such as backup administration, remote system administration, application management, security services, etc. that are enabled by managed service providers for any Cloud computing services.

In general, a cloud computing service has three distinct characteristics that differentiate it from a traditionally hosted service. The first one of these distinct characteristics is that it is sold to a services consumer on demand (e.g., by the minute or the hour). The second one of these distinct characteristics is that it is dynamic (e.g., a services consumer can have as much or as little of a service as they want at any given point in time). The third one of these distinct characteristics is that the service is fully managed by a cloud computing services provider (e.g., the services consumer only needs a suitably equipped client device and network connection).

Cloud computing services are rapidly being adopted by business and IT users to make their organizations more effective and to save costs. Along with this opportunity comes a new set of pain points and significant risks to enterprises that must be addressed. For example, business users are rapidly investing in their own cloud capabilities (e.g., IaaS, PaaS, and SaaS) to meet business needs while application developers want to move rapidly without the involvement of IT to provision tools and environments. These actions are creating a significant threat to IT management who are worried about considerations such as, for example, managing costs, chargeback, capacity and resources from the result of unrestrained/unplanned cloud expansion.

For many companies, effective cost management preferably includes accurate asset classification to cut costs and maintain regulatory compliance. For example, as the demand for cloud computing continues to increase, the importance of classifying cloud computing assets will likewise increase, for example to allow pricing and allocation comparisons across multiple providers or plans. Furthermore, to provide complete visibility into all of a company's assets, some companies categorize cloud computing assets in multiple categories.

SUMMARY

The illustrative embodiments provide for ranking of asset tags. An embodiment includes calculating an efficacy value of a context assigned to an asset, the efficacy value being based at least in part on a percentage of assets assigned to the context. The embodiment also includes calculating, responsive to the calculated efficacy value being within a predetermined range, a normalized relevance value of a first tag associated with the asset. The embodiment also includes generating relative relevance value for the first tag and a reason code associated with a basis for the relative relevance value of the first tag based at least in part on the normalized relevance value of the first tag. The embodiment also includes initiating, responsive to generating the relative relevance value and the reason code for the first tag, a database command on a training dataset stored in the database that includes the first tag. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
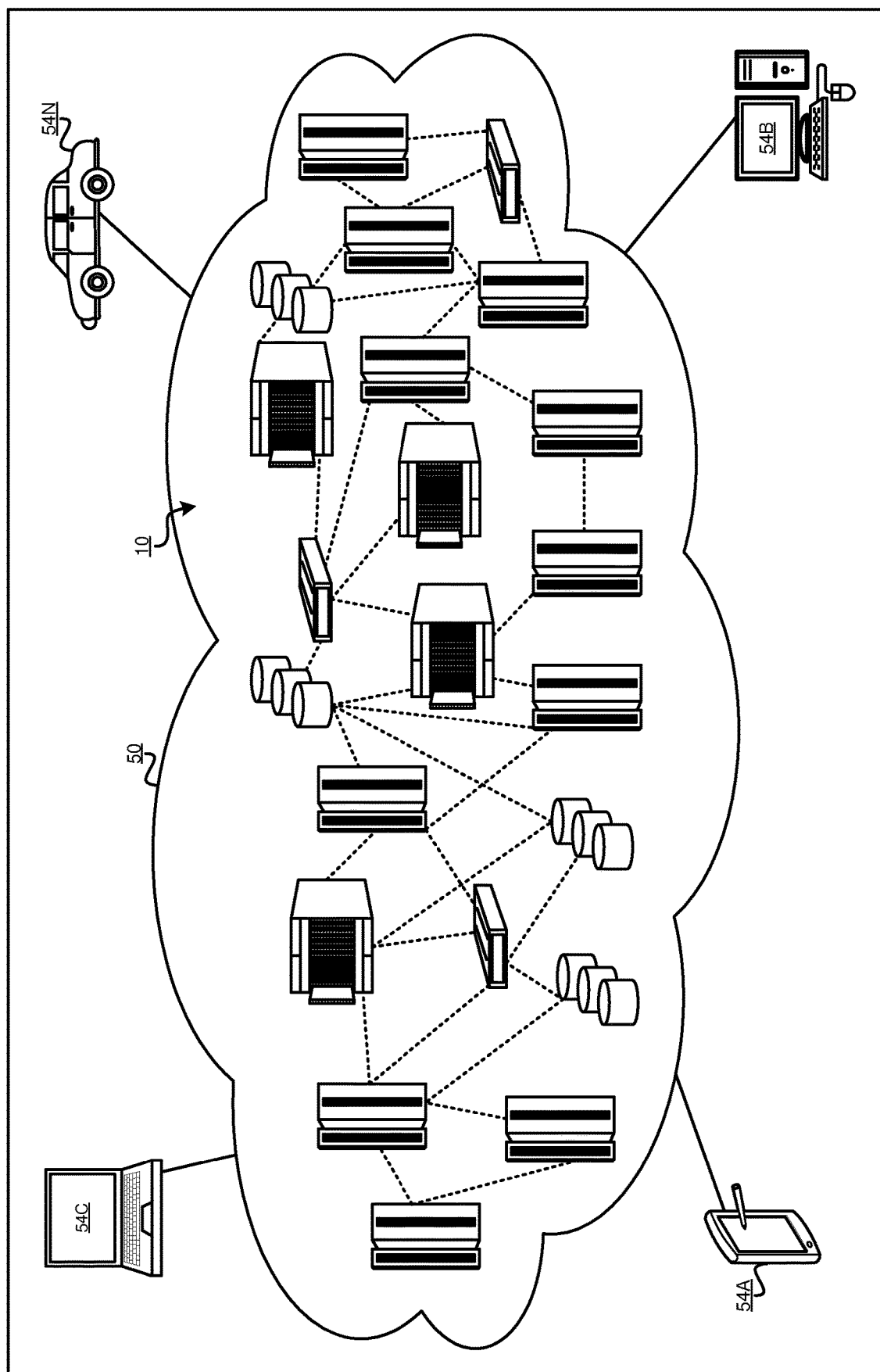
FIG. 1 depicts a cloud computing environment according to an embodiment of the present invention.

The number of cloud computing assets in many organizations continues to grow, and for some organizations the number of assets is quickly growing to, or has already surpassed, a point where it is impractical for users to manually manage so many assets. For example, there are now companies that have cloud computing assets that number into the hundreds of thousands. For such companies that assign multiple categories to each asset, it is impractical to categorize and tag such a large number of assets. Management of digital assets is further complicated by the fact that multiple organizations within many companies have the authority to independently provision, configure, and classify digital assets from multiple different providers. Since the providers do not enforce tagging rules, this typically leads to inconsistent use of labels for asset tags and tagging errors, such as misspellings, due to human error.

Thus, the illustrative embodiments recognize that it is increasingly challenging for companies to maintain and implement a classification policy across all digital asset providers and internal organizations. The illustrative embodiments also recognize that a cognitive asset management system may provide tagging recommendations while eliminating such inconsistencies and errors. The illustrative embodiments include a computerized and automated predictive modeling system that attempts to predict a most likely outcome for a given starting condition based on a model. Various models can be used in this context, such as the naive Bayes model, the k-nearest neighbor algorithm, logistic regression, etc.

The illustrative embodiments also recognize that the process of predictive modeling depends on the use of a ground truth set (i.e., a data set comprising members of a known classification) as training data to train a classifier to automatically classify unknown members of an input data set. However, illustrative embodiments further recognize that a current challenge for improving the accuracy of predictive modeling stems from the fact that the training data for such a system will still typically already include training samples labeled (or tagged) with one or more class labels that were manually applied and therefore include inconsistencies and errors. As a result, illustrative embodiments recognize that the accuracy of a predictive modeling system will be limited due to the errors and inconsistencies in the ground truth set used to train that system. However, because a ground truth set may contain millions of tagging examples, it is impractical or impossible for someone to manually review and correct such a large amount of data with a high degree of accuracy and efficiency.

Thus, the illustrative embodiments recognize that it the accuracy of a cognitive tagging system may be improved by implementing a computerized system for improving the quality of tags in a ground truth set used to train the cognitive tagging system. The illustrative embodiments also recognize that a computerized system for improving the quality of tags will include a tag ranking system that operates according to a tag ranking process that ranks tags according to relevance and replaces less relevant tags with more relevant tags.

The illustrative embodiments further recognize that a tag ranking process that improves the quality of tags in a ground truth set also improves the quality of the ground truth set as a training set. Also, according to some embodiments, a tag ranking process improves the quality of tags in a ground truth set without diminishing the usefulness of the tags from the user's perspective. For example, in some embodiments, a tag ranking process evaluates asset tags according to a process that accounts for historical user activities, such as past usage of a tag for labeling assets and/or for asset queries.

In the illustrative embodiments, a tag ranking process receives data for cloud assets that are organized into groups, which are referred to herein as contexts. Non-limiting examples of cloud assets include cloud-based virtual machines, cloud-based containers, and cloud-based services, such as Infrastructure as a Service (IaaS), Software as a Service (SaaS), and Platform as a Service (PaaS) cloud assets. The cloud asset data also includes tag information for cloud assets that have been labeled with a tag. A tag is a label that can be assigned to an asset for filtering of assets in the asset list. Users can use tags to organize assets and to search for assets. Users can also use tags to help with identifying specific team usage or cost allocation in usage reports.

In the illustrative embodiments, a tag ranking process calculates an efficacy value for each group, or context, of cloud assets. In some embodiments, the efficacy value is used to identify contexts in which tags are problematic, and thereby identify contexts for which the ranking of tags problems is desirable and viable. In some embodiments, the efficacy value is a context efficacy index (CEI) that signifies the usefulness or viability of a machine-learning (ML) classifier for each group of cloud assets. A ML classifier is a ML model that predicts appropriate tags for cloud assets based on tagged asset data. The CEI signifies whether the ML classifier is not viable for the context, viable and beneficial for the context, or viable but not necessary for the context. For example, in some embodiments, the ML classifier is not viable for a context if none of the assets are tagged or if all of the assets are tagged with a same single tag. In some embodiments, the ML classifier is viable and beneficial for a context if some, but not all, assets are tagged with one of a plurality of different tags. In some embodiments, the ML classifier is viable but not necessary for a context if all, or substantially all, cloud assets are tagged with one of a plurality of different tags. In some embodiments, substantially all assets being tagged refers to a context in which such a small number of assets remain untagged that the remaining untagged assets can quickly be manually tagged or otherwise can be manually tagged with a small enough effort such that an entity may determine that the ML process is not justified.

In some embodiments, a tag ranking process calculates a CEI for each context where the CEI is based at least in part on a percentage of assets assigned to the respective context. In some embodiments, a tag ranking process calculates a CEI for each context where the CEI is based at least in part on a number of different labels used to tag assets in the respective context. In some embodiments, a tag ranking process calculates a CEI for each context according to expressions (1) and (2) below.

$$CEI = \rho \cdot S \cdot \frac{\eta + 1}{\eta} \quad (1)$$

$$S = -\sum_i P_i \log P_i \quad (2)$$

In expressions (1) and (2) above, a CEI for a subject context is calculated with ρ representing a ratio of a number of tagged assets in the subject context to a total number of assets, S representing an entropy of the subject context according to expression (2), and η representing a number of unique labels used to tag assets in the subject context. In the illustrative embodiment, the entropy value of the context is calculated using entropy as defined in information theory, also referred to as Shannon entropy, introduced by the mathematician Claude E. Shannon in a 1948 paper "A Mathematical Theory of Communication," The Bell System Technical Journal, vol. 27, pp. 379-423, 623-656, July, October 1948. In the illustrative embodiment, the entropy value is calculated using Shannon Entropy in which i represents possible outcomes, which are possible tags i for the present context entropy calculation, and in which P represents a probability of a tag i occurring in the subject context.

In some embodiments, a tag ranking process calculates a CEI value for each context, and proceeds with processing each context based on the calculated CEI values. For example, in some embodiments, the user sets threshold upper and lower CEI values. In some such embodiments, if the CEI value is at or below the lower threshold value, the CEI value signifies that the ML classifier is not viable for the context, for example because none of the assets are tagged or all of the assets are tagged with a same single tag. In some such embodiments, if the CEI value is at or above the upper threshold value, the ML classifier is viable but not necessary for the subject context if all, or substantially all, cloud assets are tagged with one of a plurality of different tags. Thus, in some embodiments, if the CEI value is at or above the upper threshold value, the tag ranking process also determines whether a percentage of assets that are tagged in the subject context is above a threshold percentage. In some such embodiments, if the percentage of assets that are tagged in the subject context is at or above a threshold percentage, the tag ranking process determines that all or substantially all assets in the subject context are tagged. In some such embodiments, substantially all assets being tagged refers to a context in which such a small number of assets remain untagged that the remaining untagged assets can quickly be manually tagged or otherwise can be manually tagged with a small enough effort such that an entity may determine that the ML process is not justified.

In some embodiments, if the tag ranking process determines that the CEI value is between the threshold upper and lower CEI values, or if the tag ranking process determines that the CEI value is at or above the upper threshold value but the percentage of assets that are tagged in the subject context is below a threshold percentage, the context is a midrange context. In some embodiments, the tag ranking process concludes that the ML classifier is viable and beneficial for the midrange contexts and proceeds with a tag ranking refinement procedure for the midrange contexts.

In some embodiments, the tag ranking refinement procedure of the tag ranking process includes calculating normalized relevance values of all of the tags of all of the midrange contexts. In some embodiments, a tag is associated with assets of two or more of the midrange contexts, in which case the tag ranking process treats the same tag associated with assets of different contexts as different tags. For example, if a tag is associated with assets of first and second midrange contexts, the tag ranking process calculates a first normalized relevance value for the tag with respect to the first midrange context and calculates a second normalized relevance value for the tag with respect to the second midrange context, and the tags are ranked separately with respect to the first and second midrange contexts.

In some embodiments, the tag ranking process generates relative relevance value for all of the tags of all of the midrange contexts. For example, in some embodiments, the tag ranking process ranks the tags based on the normalized relevance values. In some embodiments, the tag ranking process also assigns reason codes to at least some of the tags that are among the lowest ranking tags, where the reason codes provide explanations for the relatively low ranking values of the tags.

In some embodiments, the tag ranking refinement procedure of the tag ranking process calculates normalized relevance values of all of the tags of all of the midrange contexts. In some embodiments, the tag ranking process calculates the normalized relevance values by first calculating baseline relevance values of the tags. In some embodiments, the tag ranking process calculates a baseline relevance value using a Label Frequency-Inverse Context Frequency (LF-ICF) calculation that is analogous to a term frequency-inverse document frequency (TF-IDF) calculation. A TF-IDF calculation provides a numerical statistic intended to reflect how important a word is to a document in a collection or corpus. Similarly, the LF-ICF calculation provides a numerical statistic that reflects how important a label is to the midrange context having an asset tagged with that label. In some embodiments, the LF-ICF value is calculated according to expression (3) below.

$$LF - ICF = \frac{A_c}{A_t} \log e^{(C_t/C_l)} \quad (3)$$

In expression (3) above, $A_c$ represents the number of assets grouped in a subject midrange context, $A_t$ represents the total number of assets, $C_t$ represents the total number of contexts, and $C_l$ represents the number of contexts that include an asset labeled with the subject tag.

In some embodiments, the tag ranking process includes a lower threshold relevance value that a user can adjust. In some embodiments, a user can adjust the lower threshold relevance value depending on how aggressively the user wants the tag ranking process to filter out tags based on relevancy of the tags. In some embodiments, the tag ranking process associates a relevance reason code with all of the tags having an LF-ICF relevance value at or below the lower threshold relevance value.

In some embodiments, the tag ranking refinement procedure of the tag ranking process calculates first adjusted relevance values of all of the tags of all of the midrange contexts. In some embodiments, the tag ranking process calculates a first adjusted relevance value of a tag used in a subject midrange context by adjusting the tag's baseline relevance value based at least in part on a ratio of a number of assets of the subject midrange context that are associated with the tag to a number of assets of the subject midrange context that are associated with at least one of a specified plurality of tags. In some embodiments, the specified plurality of tags are tags that have previously been identified by a user or by an algorithm of the tag ranking system as being an ambiguous grouping of tags.

In some embodiments, tags are grouped into an ambiguous grouping whenever the tags appear to be different forms of the same word or phrase. For example, in some embodiments, the tag ranking process groups tags into an ambiguous grouping where one tag is an abbreviation, misspelling, or synonym of another tag. As a non-limiting example, in some embodiments, a midrange context includes one or more assets tagged with "PROD," one or more assets tagged with "PRODUCTION," and one or more assets tagged with "PRODUCTOIN." In this example, the tag ranking system recognizes that the tag "PROD" is an abbreviation of "PRODUCTION" and the tag "PRODUCTOIN" is a misspelling of "PRODUCTION" so these three tags are grouped together into an ambiguous grouping.

In some embodiments, the tag ranking process calculates a first adjusted relevance value as a Normalized LF-ICF (NLF-ICF) of a tag used in a subject midrange context according to expression (4) below.

$$NLF - ICF = LF - ICF \cdot \frac{A_l}{A_{t-AG}} \qquad (4)$$

In expression (4) above, $A_l$ represents the number of assets in the subject midrange context that are labeled with the subject tag, and $A_{t-AG}$ represents the total number of assets in the ambiguous grouping.

In some embodiments, the tag ranking process includes a lower threshold ambiguity value that a user can adjust. In some embodiments, a user can adjust the lower threshold ambiguity value depending on how aggressively the user wants the tag ranking process to filter out tags based on ambiguity of the tags. In some embodiments, the tag ranking process associates an ambiguity reason code with all of the tags having an NLF-ICF ambiguity value at or below the lower threshold ambiguity value.

In some embodiments, the tag ranking refinement procedure of the tag ranking process calculates second adjusted relevance values of all of the tags of all of the midrange contexts. In some embodiments, the tag ranking process calculates a second adjusted relevance value of a tag used in a subject midrange context by adjusting the tag's first adjusted relevance value, also referred to as the tag's NLF-ICF value, based at least in part on usage data associated with the tag. In some embodiments, the usage data comprises a ratio of a number of users that use the tag to a total number of users. In some embodiments, the usage data comprises a ratio of a number of searches that use the tag to a total number of searches. In some embodiments, the tag ranking process calculates a second adjusted relevance value as a FinalRank value of a tag used in a subject midrange context according to expression (5) below.

$$FinalRank = NLF - ICF \cdot \frac{Q_l}{Q_t} \cdot \frac{U_l}{U_t} \qquad (5)$$

In expression (5) above, $Q_l$ represents the number of queries in the subject midrange context that used the subject tag during a specified time period, $Q_t$ represents the total number of queries in the subject midrange context during the specified time period, $U_l$ represents the number of users utilizing the subject tag in the subject midrange context, and $U_t$ represents the total number of users.

In some embodiments, the tag ranking process includes a lower threshold usage value that a user can adjust. In some embodiments, a user can adjust the lower threshold usage value depending on how aggressively the user wants the tag ranking process to filter out tags based on usage of the tags. In some embodiments, the tag ranking process associates a usage reason code with all of the tags having a FinalRank usage value at or below the lower threshold usage value.

In some embodiments, once the tag ranking process completes the calculations of the LF-ICF, NLF-ICF, and FinalRank values of all of the tags of the midrange contexts, the tag ranking process ranks the tags based on the FinalRank values and assigns a ranking to each tag. In some embodiments, the tag ranking process then initiates a database command on the training dataset that includes the tags and midrange contexts to store the FinalRank values and ranks of the tags, and the reason codes, if any, such that the values and reason codes are associated with the tags in the database. In some embodiments, the values and reason codes are stored as asset tag meta-data in the database.

In some embodiments, the tag ranking system receives a training request from a user and parses request data to identify a machine-learning model associated with the training request. In some embodiments, the tag ranking system identifies the training dataset stored with the rank values and reason codes as training data for training the machine-learning model associated with the training request. In some embodiments, the tag ranking system extends the ML lifecycle to automatically update the training data based on tag rank values and reason codes to improve training accuracy. In some embodiments, tags are ranked as outliers for reasons identified by reason codes based on relevancy, ambiguity, or usage. In some embodiments, for outlier tags having an ambiguity reason code, assets are be re-tagged with higher ranking labels. In some embodiments, for outlier tags having a relevancy or usage reason code, the asset tags are removed.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
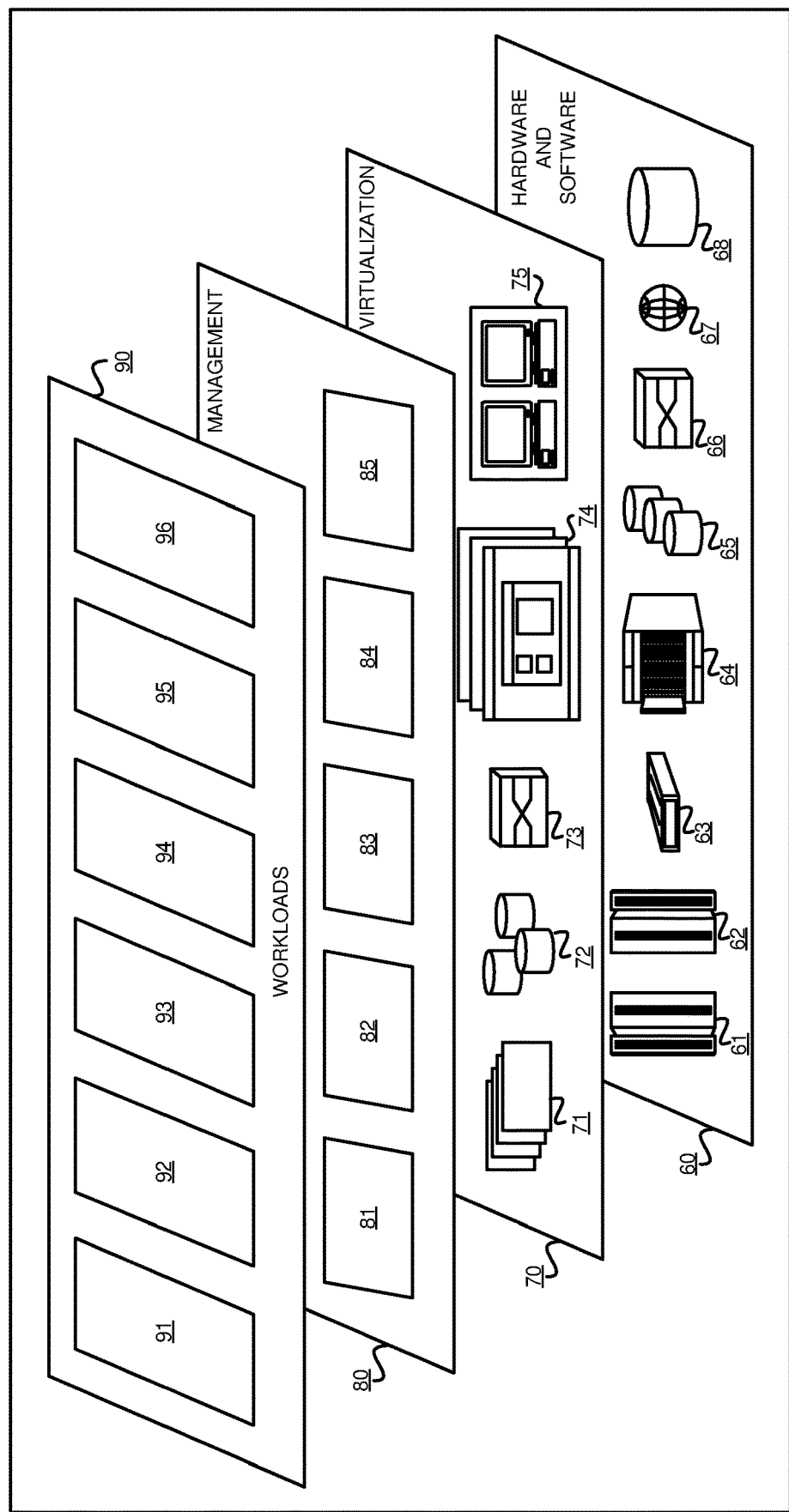
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data processing 96.

Figure 3:
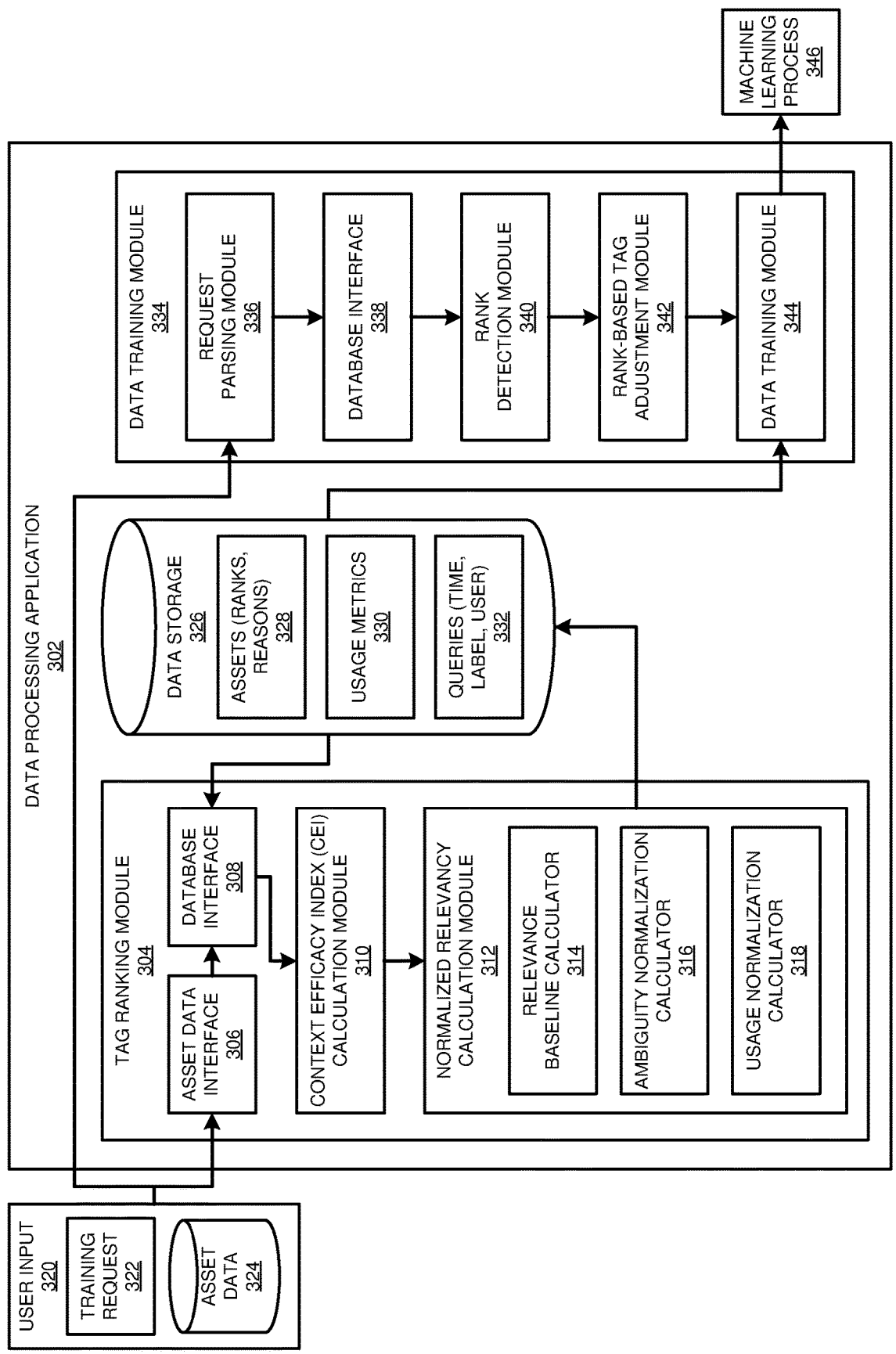
FIG. 3 depicts a block diagram of an example environment for a data processing application that includes a tag ranking module in accordance with an illustrative embodiment.

With reference to FIG. 3, this figure depicts a block diagram of an example environment 300 for a data processing application 302 in accordance with an illustrative embodiment. In a particular embodiment, application 302 is an example of data processing of FIG. 2.

In some embodiments, the data processing application 302 includes a tag ranking module 304, data storage 326, and a data training module 334. In some embodiments, the tag ranking module 304 receives data for cloud assets that are organized into contexts, calculates efficacy values for each context to identify midrange contexts, ranks tags of the midrange contexts based on normalized relevancy values, and associates reason codes for tags that rank below a threshold value. In some embodiments, the data storage 326 stores ranking values and reason codes for the tags as determined by the tag ranking module 304. In some embodiments, the data training module 334 extends the ML lifecycle to automatically update the training data based on the ranking values and reason codes stored in the data storage 326 to improve training accuracy. In alternative embodiments, the data processing application 302 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In an embodiment, the tag ranking module 304 includes an asset data interface 306, a database interface 308, a CEI calculation module 310, and a normalized relevancy calculation module 312 that comprises a relevance baseline calculator 314, an ambiguity normalization calculator 316, and a usage normalization calculator 318. In some embodiments, the asset data interface 306 receives user inputs 320, including ingestions of cloud asset data 324. In some embodiments, the database interface 308 communicates with data storage 326, for example to retrieve usage metrics data 330 and queries data 332.

In some embodiments, the CEI calculation module 310 receives asset data for a plurality of cloud assets grouped into contexts, and calculates a CEI value for each context. In some embodiments, the CEI calculation module 310 calculates a CEI for each context according to expressions (6) and (7) below.

$$CEI = \rho \cdot S \cdot \frac{\eta+1}{\eta} \quad (6)$$

$$S = -\sum_i P_i \log P_i \quad (7)$$

In expressions (6) and (7) above, the CEI calculation module 310 calculates a CEI for a subject context with ρ representing a ratio of a number of tagged assets in the subject context to a total number of assets, S representing an entropy of the subject context according to expression (7), and η representing a number of unique labels used to tag assets in the subject context. In the illustrative embodiment, the CEI calculation module 310 calculates the entropy value of the context using entropy as defined in information theory, also referred to as Shannon entropy, introduced by the mathematician Claude E. Shannon in a 1948 paper "A Mathematical Theory of Communication," The Bell System Technical Journal, vol. 27, pp. 379-423, 623-656, July, October 1948. In the illustrative embodiment, the CEI calculation module 310 calculates the entropy value using Shannon Entropy in which i represents possible outcomes, which are possible tags i for the present context entropy calculation, and in which P represents a probability of a tag i occurring in the subject context.

In some embodiments, the CEI calculation module 310 calculates a CEI value for each context, and proceeds with processing each context based on the calculated CEI values. For example, in some embodiments, the user sets threshold upper and lower CEI values. In some such embodiments, if the CEI value is at or below the lower threshold value, the CEI value signifies that the ML classifier is not viable for the context, for example because none of the assets are tagged or all of the assets are tagged with a same single tag. In some such embodiments, if the CEI value is at or above the upper threshold value, the ML classifier is viable but not necessary for the subject context if all, or substantially all, cloud assets are tagged with one of a plurality of different tags. Thus, in some embodiments, if the CEI value is at or above the upper threshold value, the CEI calculation module 310 also determines whether a percentage of assets that are tagged in the subject context is above a threshold percentage. In some such embodiments, if the percentage of assets that are tagged in the subject context is at or above a threshold percentage, the CEI calculation module 310 determines that all or substantially all assets in the subject context are tagged. In some such embodiments, substantially all assets being tagged refers to a context in which such a small number of assets remain untagged that the remaining untagged assets can quickly be manually tagged or otherwise can be manually tagged with a small enough effort such that an entity may determine that the ML process is not justified.

In some embodiments, if the CEI calculation module 310 determines that the CEI value is between the threshold upper and lower CEI values, or if the tag ranking process determines that the CEI value is at or above the upper threshold value but the percentage of assets that are tagged in the subject context is below a threshold percentage, the context is a midrange context. In some embodiments, the CEI calculation module 310 concludes that the ML classifier is viable and beneficial for the midrange contexts and provides the data to the normalized relevancy calculation module 312 for a tag ranking and refinement procedure for the midrange contexts.

In some embodiments, the normalized relevancy calculation module 312 calculates normalized relevance values of all of the tags of all of the midrange contexts. In some embodiments, a tag is associated with assets of two or more of the midrange contexts, in which case the tag ranking process treats the same tag associated with assets of different contexts as different tags. For example, if a tag is associated with assets of first and second midrange contexts, the normalized relevancy calculation module 312 calculates a first normalized relevance value for the tag with respect to the first midrange context and calculates a second normalized relevance value for the tag with respect to the second midrange context, and the normalized relevancy calculation module 312 ranks the tags separately with respect to the first and second midrange contexts.

In some embodiments, the normalized relevancy calculation module 312 generates relative relevance values for all of the tags of all of the midrange contexts. For example, in some embodiments, the normalized relevancy calculation module 312 ranks the tags based on the normalized relevance values. In some embodiments, the normalized relevancy calculation module 312 also assigns reason codes to at least some of the tags that are among the lowest ranking tags, where the reason codes provide explanations for the relatively low ranking values of the tags.

In some embodiments, the normalized relevancy calculation module 312 calculates normalized relevance values of all of the tags of all of the midrange contexts. In some embodiments, the normalized relevancy calculation module 312 calculates the normalized relevance values by first using the relevance baseline calculator 314 to calculate baseline relevance values of the tags. In some embodiments, the relevance baseline calculator 314 calculates a baseline relevance value using a Label Frequency-Inverse Context Frequency (LF-ICF) calculation that is analogous to a term frequency-inverse document frequency (TF-IDF) calculation. A TF-IDF calculation provides a numerical statistic intended to reflect how important a word is to a document in a collection or corpus. Similarly, the LF-ICF calculation provides a numerical statistic that reflects how important a label is to the midrange context having an asset tagged with that label. In some embodiments, the relevance baseline calculator 314 calculates the LF-ICF value according to expression (7) below.

$$LF - ICF = \frac{A_c}{A_t} \log e^{(C_t/C_l)} \quad (7)$$

In expression (7) above, $A_c$ represents the number of assets grouped in a subject midrange context, $A_t$ represents the total number of assets, $C_t$ represents the total number of contexts, and $C_l$ represents the number of contexts that include an asset labeled with the subject tag.

In some embodiments, the relevance baseline calculator 314 includes a lower threshold relevance value that a user can adjust. In some embodiments, a user can adjust the lower threshold relevance value depending on how aggressively the user wants the relevance baseline calculator 314 to filter out tags based on relevancy of the tags. In some embodiments, the relevance baseline calculator 314 associates a relevance reason code with all of the tags having an LF-ICF relevance value at or below the lower threshold relevance value.

In some embodiments, the ambiguity normalization calculator 316 calculates first adjusted relevance values of all of the tags of all of the midrange contexts. In some embodiments, the ambiguity normalization calculator 316 calculates a first adjusted relevance value of a tag used in a subject midrange context by adjusting the tag's baseline relevance value based at least in part on a ratio of a number of assets of the subject midrange context that are associated with the tag to a number of assets of the subject midrange context that are associated with at least one of a specified plurality of tags. In some embodiments, the specified plurality of tags are tags that have previously been identified by a user or by an algorithm of the tag ranking system as being an ambiguous grouping of tags.

In some embodiments, tags are grouped into an ambiguous grouping whenever the tags appear to be different forms of the same word or phrase. For example, in some embodiments, the ambiguity normalization calculator 316 groups tags into an ambiguous grouping where one tag is an abbreviation, misspelling, or synonym of another tag. As a non-limiting example, in some embodiments, a midrange context includes one or more assets tagged with "PROD," one or more assets tagged with "PRODUCTION," and one or more assets tagged with "PRODUCTOIN." In this example, the ambiguity normalization calculator 316 recognizes that the tag "PROD" is an abbreviation of "PRODUCTION" and the tag "PRODUCTOIN" is a misspelling of "PRODUCTION" so these three tags are grouped together into an ambiguous grouping.

In some embodiments, the ambiguity normalization calculator 316 calculates a first adjusted relevance value as a Normalized LF-ICF (NLF-ICF) of a tag used in a subject midrange context according to expression (8) below.

$$NLF - ICF = LF - ICF \cdot \frac{A_l}{A_{t-AG}} \quad (8)$$

In expression (8) above, $A_l$ represents the number of assets in the subject midrange context that are labeled with the subject tag, and $A_{t-AG}$ represents the total number of assets in the ambiguous grouping.

In some embodiments, the ambiguity normalization calculator 316 includes a lower threshold ambiguity value that a user can adjust. In some embodiments, a user can adjust the lower threshold ambiguity value depending on how aggressively the user wants the ambiguity normalization calculator 316 to filter out tags based on ambiguity of the tags. In some embodiments, the ambiguity normalization calculator 316 associates an ambiguity reason code with all of the tags having an NLF-ICF ambiguity value at or below the lower threshold ambiguity value.

In some embodiments, the usage normalization calculator 318 calculates second adjusted relevance values of all of the tags of all of the midrange contexts. In some embodiments, the usage normalization calculator 318 calculates a second adjusted relevance value of a tag used in a subject midrange context by adjusting the tag's first adjusted relevance value, also referred to as the tag's NLF-ICF value, based at least in part on usage data associated with the tag. In some embodiments, the usage data comprises a ratio of a number of users that use the tag to a total number of users. In some embodiments, the usage data comprises a ratio of a number of searches that use the tag to a total number of searches. In some embodiments, the usage normalization calculator 318 calculates a second adjusted relevance value as a FinalRank value of a tag used in a subject midrange context according to expression (9) below.

$$FinalRank = NLF - ICF \cdot \frac{Q_l}{Q_t} \cdot \frac{U_l}{U_t} \quad (9)$$

In expression (9) above, $Q_l$ represents the number of queries in the subject midrange context that used the subject tag during a specified time period, $Q_t$ represents the total number of queries in the subject midrange context during the specified time period, $U_l$ represents the number of users utilizing the subject tag in the subject midrange context, and $U_t$ represents the total number of users.

In some embodiments, the usage normalization calculator 318 includes a lower threshold usage value that a user can adjust. In some embodiments, a user can adjust the lower threshold usage value depending on how aggressively the user wants the usage normalization calculator 318 to filter out tags based on usage of the tags. In some embodiments, the usage normalization calculator 318 associates a usage reason code with all of the tags having a FinalRank usage value at or below the lower threshold usage value.

In some embodiments, once the normalized relevancy calculation module 312 completes the calculations of the LF-ICF, NLF-ICF, and FinalRank values of all of the tags of the midrange contexts, the normalized relevancy calculation module 312 ranks the tags based on the FinalRank values and assigns a ranking to each tag. In some embodiments, the normalized relevancy calculation module 312 then initiates a database command on the training dataset that includes the tags and midrange contexts to store the FinalRank values and ranks of the tags, and the reason codes, if any, as asset data 328 in data storage 326 such that the values and reason codes are associated with the tags in the data storage 326. In some embodiments, the normalized relevancy calculation module 312 stores the values and reason codes as asset tag meta-data in the data storage 326.

In an embodiment, the data training module 334 includes a request parsing module 336, a database interface 338, a rank detection module 340, a rank-based tag adjustment module 342, and a data training module 344 that outputs training data to a machine learning process 346. In some embodiments, the request parsing module 336 receives user inputs 320, including training requests 322 for training an asset classification model to recommend tags for cloud assets. In some embodiments, the database interface 338 communicates with data storage 326, for example to retrieve cloud asset data including rank values and reason codes generated by the tag ranking module 304.

In some embodiments, the request parsing module 336 receives a training request 322 from a user and parses the request data to identify a machine-learning model associated with the training request. In some embodiments, the database interface 338 retrieves the cloud asset data 328 for use as a training dataset, along with the rank values and reason codes stored with the cloud asset data 328. In some embodiments, rank detection module 340 detects the rank values stored with the cloud asset values and forwards the tag and rank information to the rank-based tag adjustment module 342. In some embodiments, the rank-based tag adjustment module 342 automatically updates the training data based on the tag rank values and reason codes to improve training accuracy. In some embodiments, the rank-based tag adjustment module 342 re-tags outlier tags having an ambiguity reason code with a higher-ranking tag. In some embodiments, the rank-based tag adjustment module 342 removes tags having a relevancy or usage reason code. In some embodiments, the rank-based tag adjustment module 342 forwards the data with the adjusted tags to a data training module 344 for a final data training process before providing the training data to a machine learning process 346.

Figure 4:
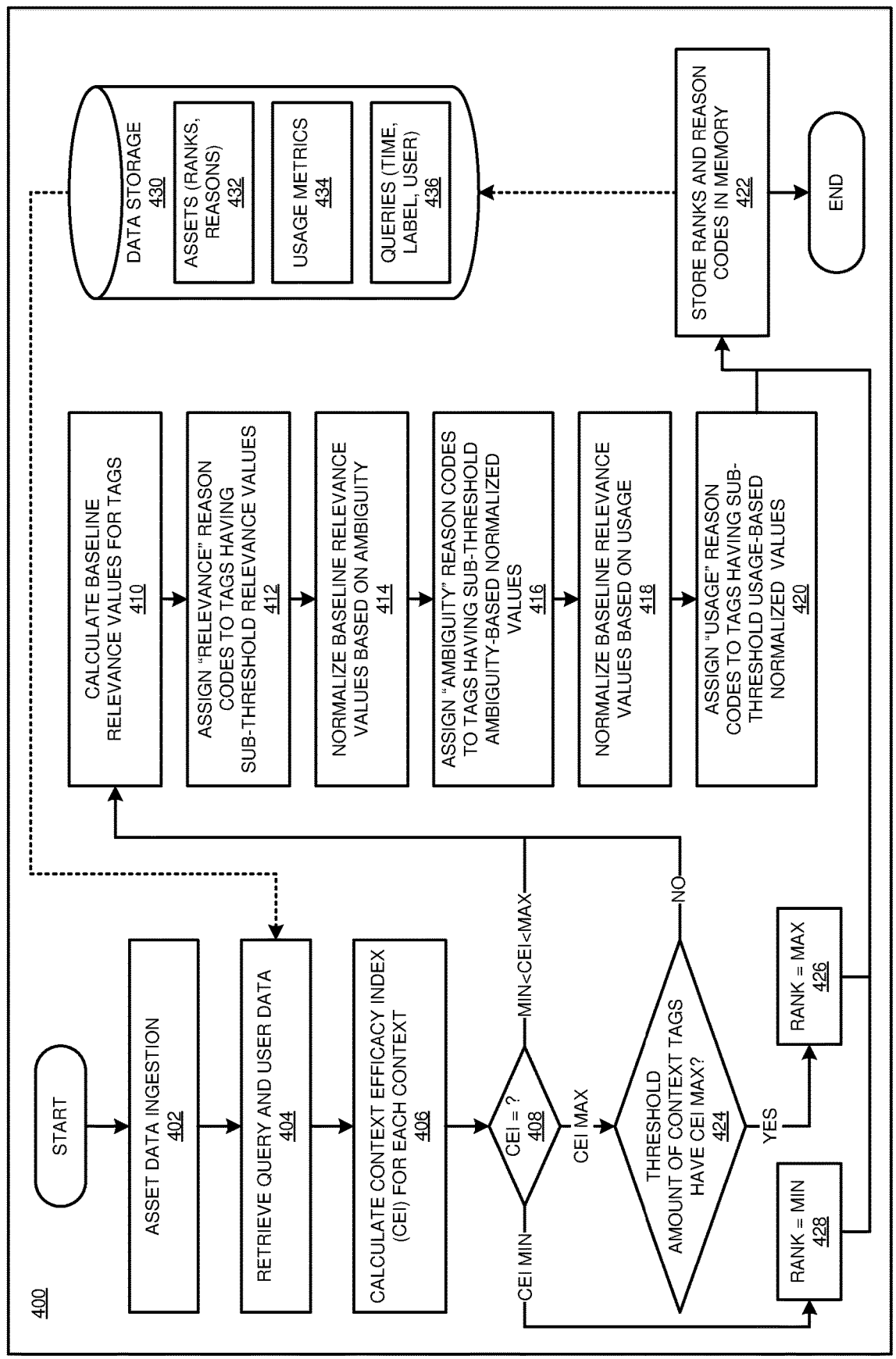
FIG. 4 depicts a flowchart of an example process for ranking of asset tags in accordance with an illustrative embodiment.

With reference to FIG. 4 this figure depicts a flowchart of a tag ranking example process 400 in accordance with an illustrative embodiment. In a particular embodiment, the tag ranking module 304 carries out the process 400.

In an embodiment, at block 402, a tag ranking process receives an ingestion of cloud asset data for cloud assets that are organized into contexts. Next, at block 404, the tag ranking process retrieves query data 436 and usage data 434 from data storage 430 associated with the cloud asset data received at block 402.

In some embodiments, at block 406, the tag ranking process calculates a CEI for each context according to expressions (10) and (11) below.

$$CEI = \rho \cdot S \cdot \frac{\eta + 1}{\eta} \quad (10)$$

$$S = -\sum_i P_i \log P_i \quad (11)$$

In expressions (10) and (11) above, a CEI for a subject context is calculated with $\rho$ representing a ratio of a number of tagged assets in the subject context to a total number of assets, S representing an entropy of the subject context according to expression (2), and $\eta$ representing a number of unique labels used to tag assets in the subject context. In the illustrative embodiment, the entropy value of the context is calculated using entropy as defined in information theory, also referred to as Shannon entropy, introduced by the mathematician Claude E. Shannon in a 1948 paper "A Mathematical Theory of Communication," The Bell System Technical Journal, vol. 27, pp. 379-423, 623-656, July, October 1948. In the illustrative embodiment, the entropy value is calculated using Shannon Entropy in which i represents possible outcomes, which are possible tags i for the present context entropy calculation, and in which P represents a probability of a tag i occurring in the subject context.

Next, at block 408, the tag ranking process determines, for each context, whether the respective CEI value is at or below a lower threshold value (CEI MIN), which signifies that the ML classifier is not viable for the context, so at block 428 the process assigns a minimum rank value to tags in such contexts. Alternatively, at block 408, the tag ranking process determines, for each context, whether the CEI value is at or above an upper threshold value (CEI MAX), which signifies that the ML classifier is viable but not necessary for the subject context if all, or substantially all, cloud assets are tagged with one of a plurality of different tags. Thus, in some embodiments, if the CEI value is at or above the upper threshold value, the process continues to block 424 where the tag ranking process determines whether a percentage of assets that are tagged in the subject context is above a threshold percentage. If so, the process continues to block 426, where the process assigns a maximum rank value to tags in such contexts. Otherwise, if the CEI value is between the threshold upper and lower CEI values, or if the tag ranking process at block 424 determines that the CEI value is at or above the upper threshold value but the percentage of assets that are tagged in the subject context is below a threshold percentage, the process continues to block 410 where such contexts are regarded as midrange contexts.

In some embodiments, at block 410, the process calculates a baseline relevance value using a Label Frequency-Inverse Context Frequency (LF-ICF) calculation according to expression (12) below.

$$LF - ICF = \frac{A_c}{A_t} \log e^{(C_t/C_l)} \quad (12)$$

In expression (12) above, $A_c$ represents the number of assets grouped in a subject midrange context, $A_t$ represents the total number of assets, $C_t$ represents the total number of contexts, and $C_l$ represents the number of contexts that include an asset labeled with the subject tag. Next, at block 412, the process compares the an LF-ICF relevance values to a lower relevance threshold value and associates a relevance reason code with all of the tags having an LF-ICF relevance value at or below the lower threshold relevance value.

Next, at block 414, the process calculates a first adjusted relevance value as a Normalized LF-ICF (NLF-ICF) of a tag used in a subject midrange context according to expression (13) below.

$$NLF - ICF = LF - ICF \cdot \frac{A_l}{A_{t-AG}} \quad (13)$$

In expression (13) above, $A_l$ represents the number of assets in the subject midrange context that are labeled with the subject tag, and $A_{t-AG}$ represents the total number of assets in the ambiguous grouping. Next, at block 416, the process compares the NLF-ICF first adjusted relevance value to a lower threshold ambiguity value and associates an ambiguity reason code with all of the tags having an NLF-ICF ambiguity value at or below the lower threshold ambiguity value.

Next, at block 418, the process calculates second adjusted relevance values of all of the tags of all of the midrange contexts as FinalRank values of tags used in a subject midrange context according to expression (14) below.

$$FinalRank = NLF - ICF \cdot \frac{Q_l}{Q_t} \cdot \frac{U_l}{U_t} \quad (14)$$

In expression (14) above, $Q_l$ represents the number of queries in the subject midrange context that used the subject tag during a specified time period, $Q_t$ represents the total number of queries in the subject midrange context during the specified time period, $U_l$ represents the number of users utilizing the subject tag in the subject midrange context, and $U_t$ represents the total number of users. Next, at block 420, the process compares the FinalRank second adjusted relevance value to a lower threshold usage value and associates a usage reason code with all of the tags having a FinalRank usage value at or below the lower threshold usage value.

Next, at block 422, once the tag ranking process completes the calculations of the LF-ICF, NLF-ICF, and FinalRank values of all of the tags of the midrange contexts, the process then stores the FinalRank values and reason codes, if any, associated with cloud asset data 432 in data storage 430, and the process ends.

Figure 5:
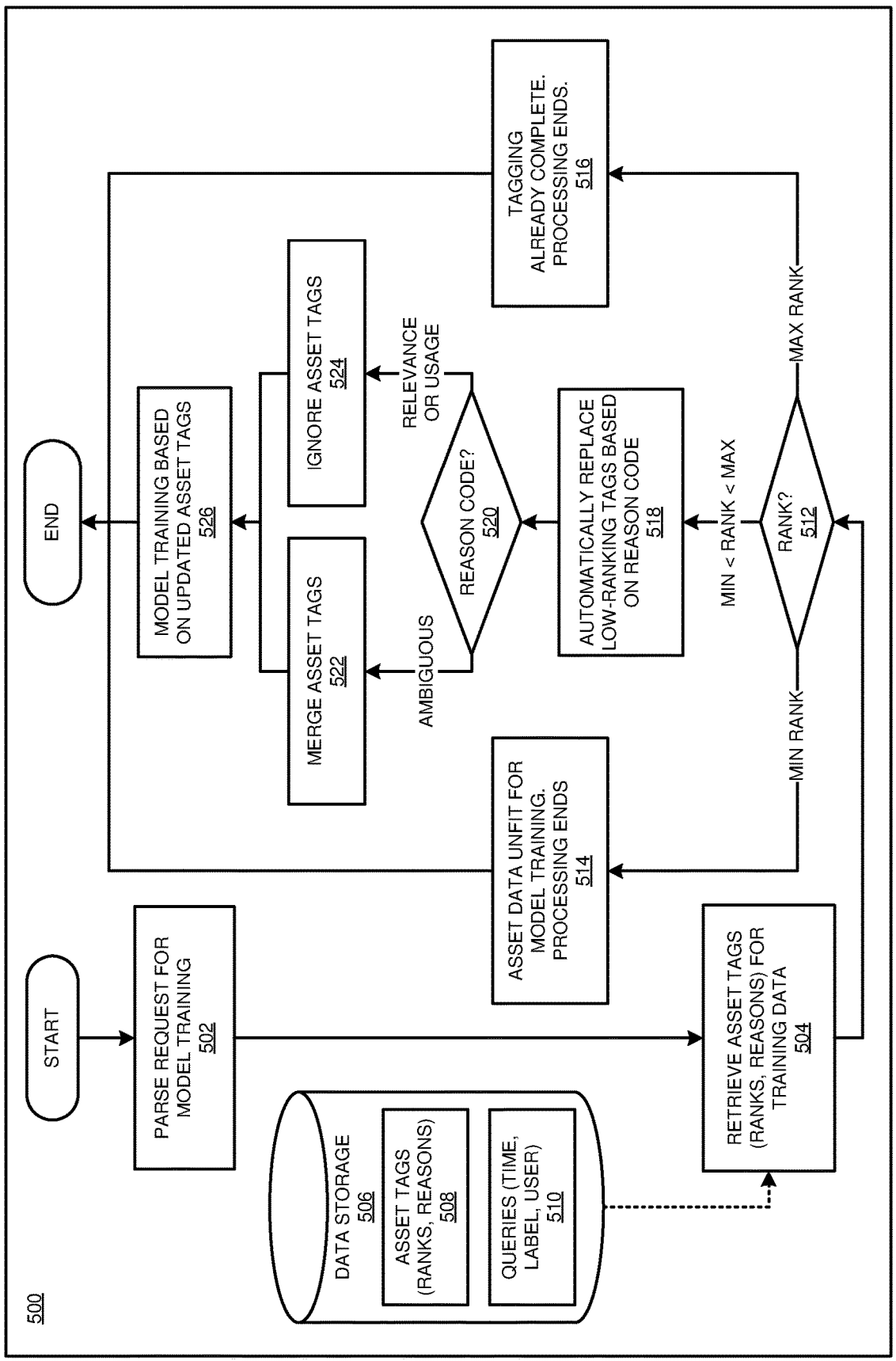
FIG. 5 depicts a flowchart of an example process for data training in accordance with an illustrative embodiment.

With reference to FIG. 5 this figure depicts a flowchart of an example data training process 500 in accordance with an illustrative embodiment. In a particular embodiment, the data training module 334 carries out the process 500.

In an embodiment, at block 502, the process stores category and label data as a key-value pair for each of a first group of cloud computing assets and attribute data for each of a second group of cloud computing assets. In an embodiment, at block 504, the process generates a document that includes a plurality of text fields of the second group of cloud computing assets having a first class label.

In an embodiment, at block 502, the process receives a training request and parses the request data to identify a machine-learning model associated with the training request. Next, at block 504, the process retrieves cloud asset data 508 including rank values and reason codes generated by the tag ranking process from data storage 506. Next, at block 512, the process the process detects the rank values of a context stored with the cloud asset values for each tag. If the process determines that the ranks of tags of the context are all minimum ranking, then at block 514 the data for the context is considered unfit for use in model training and the context is removed. If the process determines that the ranks of tags of the context are all maximum ranking, then at block 516 the data for the context is considered already complete and satisfactory, so no further processing is needed. Otherwise, at block 518, the process identifies low-ranking tags to be automatically replaced or removed. At block 520, the process detects the reason code associated with the low-ranking tags. If the reason code is an ambiguity reason code, the tag is replaced with a higher-ranking tag at block 522. Otherwise, at block 524, the process removes the tags having a relevancy or usage reason code or designates the tags as tags that should be ignored. Finally, at block 526, the data with the adjusted tags is provided to a data training module for a final data training process before providing the training data to a machine learning process.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    calculating an efficacy value of a context assigned to an asset, the efficacy value being based at least in part on a percentage of assets assigned to the context;
    calculating, responsive to the calculated efficacy value being within a predetermined range, a normalized relevance value of a first tag associated with the asset, wherein the calculating of the normalized relevance value of the first tag comprises calculating a baseline relevance value of the first tag;
    generating relative relevance value for the first tag and a reason code associated with a basis for the relative relevance value of the first tag based at least in part on the normalized relevance value of the first tag; and
    initiating, responsive to generating the relative relevance value and the reason code for the first tag, a database command on a training dataset stored in the database that includes the first tag.

2. The computer implemented method of claim 1, further comprising:
    parsing, responsive to a training request from a user, request data to identify a machine-learning model associated with the training request; and
    identifying the training dataset for training the machine-learning model.

3. The computer implemented method of claim 1, further comprising associating a relevance reason code with the tag responsive to calculating the baseline relevance value and determining that the baseline relevance value is below a threshold baseline relevance value.

4. The computer implemented method of claim 1, wherein the baseline relevance value of the first tag is based at least in part on a ratio of a number of assets of the context associated with the first tag to a number of assets of the context.

5. The computer implemented method of claim 1, wherein the calculating of the normalized relevance value of the first tag comprises calculating a first adjusted relevance value by adjusting the baseline relevance value based at least in part on a ratio of a number of assets of the context associated with the first tag to a number of assets of the context associated with at least one of a specified plurality of tags, wherein the specified plurality of tags comprises the first tag and a second tag.

6. The computer implemented method of claim 5, further comprising associating an ambiguity reason code with the tag responsive to calculating the first adjusted relevance value and determining that the first adjusted relevance value is below a threshold first adjusted relevance value.

7. The computer implemented method of claim 5, wherein the calculating of the normalized relevance value of the first tag comprises further comprises calculating a second adjusted relevance value by adjusting the first adjusted relevance value based at least in part on usage data associated with the tag.

8. The computer implemented method of claim 7, further comprising associating a usage reason code with the tag responsive to calculating the second adjusted relevance value and determining that the second adjusted relevance value is below a threshold second adjusted relevance value.

9. The computer implemented method of claim 7, wherein the usage data comprises a ratio of a number of users that use the tag to a total number of users.

10. The computer implemented method of claim 7, wherein the usage data comprises a ratio of a number of searches that use the tag to a total number of searches.

11. A computer usable program product for ranking asset tags, the computer program product comprising one or more computer readable storage media, and program instructions collectively stored on the one or more computer readable storage media, the program instructions executable by a processor to cause the processor to perform operations comprising:
    calculating an efficacy value of a context assigned to an asset, the efficacy value being based at least in part on a percentage of assets assigned to the context;
    calculating, responsive to the calculated efficacy value being within a predetermined range, a normalized relevance value of a first tag associated with the asset, wherein the calculating of the normalized relevance value of the first tag comprises calculating a baseline relevance value of the first tag;
    generating relative relevance value for the first tag and a reason code associated with a basis for the relative relevance value of the first tag based at least in part on the normalized relevance value of the first tag; and
    initiating, responsive to generating the relative relevance value and the reason code for the first tag, a database command on a training dataset stored in the database that includes the first tag.

12. The computer usable program product of claim 11, wherein the stored program instructions are stored in a computer readable storage device in a data processing system, and wherein the stored program instructions are transferred over a network from a remote data processing system.

13. The computer usable program product of claim 11, wherein the stored program instructions are stored in a computer readable storage device in a server data processing system, and wherein the stored program instructions are downloaded over a network to a remote data processing system for use in a computer readable storage device associated with the remote data processing system, further comprising:
    program instructions to meter use of the computer usable code associated with a request; and
    program instructions to generate an invoice based on the metered use.

14. The computer usable program product of claim 11, wherein the calculating of the normalized relevance value of the first tag comprises calculating a first adjusted relevance value by adjusting the baseline relevance value based at least in part on a ratio of a number of assets of the context associated with the first tag to a number of assets of the context associated with at least one of a specified plurality of tags, wherein the specified plurality of tags comprises the first tag and a second tag.

15. The computer usable program product of claim 14, wherein the calculating of the normalized relevance value of the first tag comprises further comprises calculating a second adjusted relevance value by adjusting the first adjusted relevance value based at least in part on usage data associated with the tag.

16. A computer system comprising a processor and one or more computer readable storage media, and program instructions collectively stored on the one or more computer readable storage media, the program instructions executable by the processor to cause the processor to perform operations comprising:

calculating an efficacy value of a context assigned to an asset, the efficacy value being based at least in part on a percentage of assets assigned to the context;

calculating, responsive to the calculated efficacy value being within a predetermined range, a normalized relevance value of a first tag associated with the asset, wherein the calculating of the normalized relevance value of the first tag comprises calculating a baseline relevance value of the first tag;

generating relative relevance value for the first tag and a reason code associated with a basis for the relative relevance value of the first tag based at least in part on the normalized relevance value of the first tag; and initiating, responsive to generating the relative relevance value and the reason code for the first tag, a database command on a training dataset stored in the database that includes the first tag.

17. The computer system of claim 16, wherein the calculating of the normalized relevance value of the first tag comprises:

calculating a first adjusted relevance value by adjusting the baseline relevance value based at least in part on a ratio of a number of assets of the context associated with the first tag to a number of assets of the context associated with at least one of a specified plurality of tags, wherein the specified plurality of tags comprises the first tag and a second tag; and calculating a second adjusted relevance value by adjusting the first adjusted relevance value based at least in part on usage data associated with the tag.

\* \* \* \* \*